June 16, 1964 W. A. MARTIN 3,137,057
MANUFACTURE OF MISSILE CASINGS
Filed Nov. 13, 1959 4 Sheets-Sheet 1
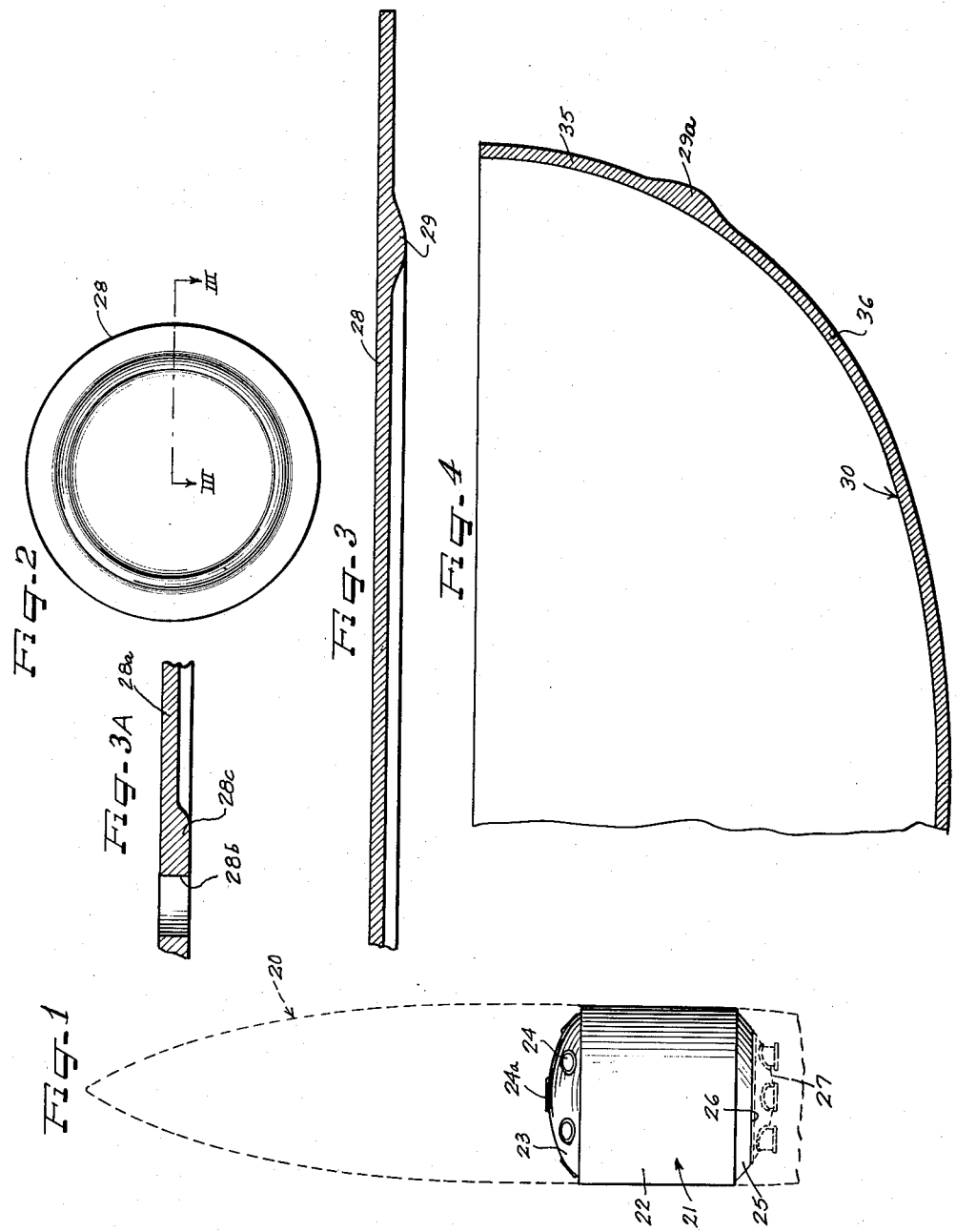
INVENTOR
Wayne A. Martin
BY
ATTORNEYS

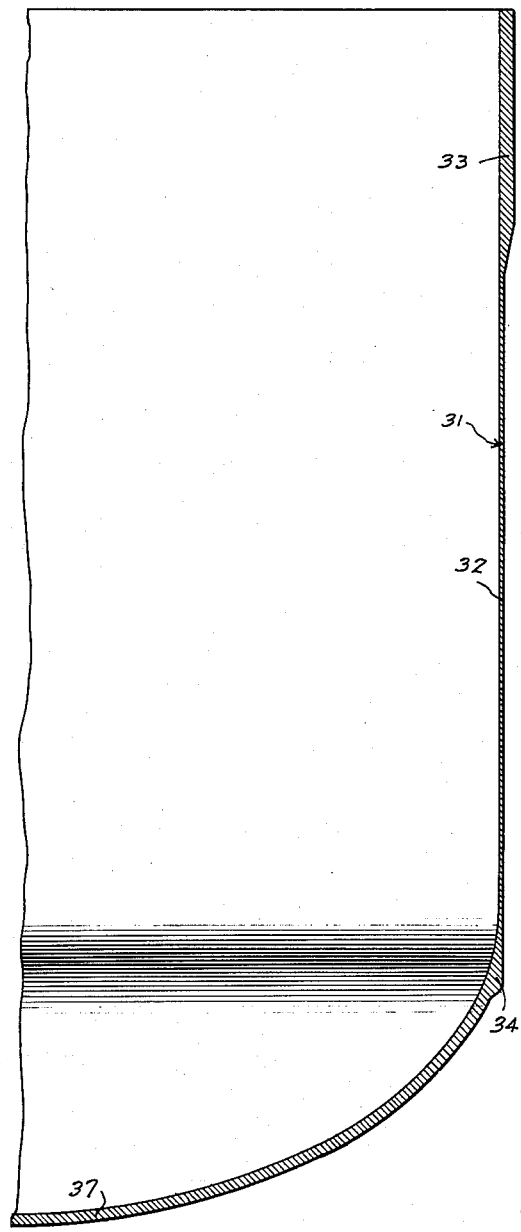
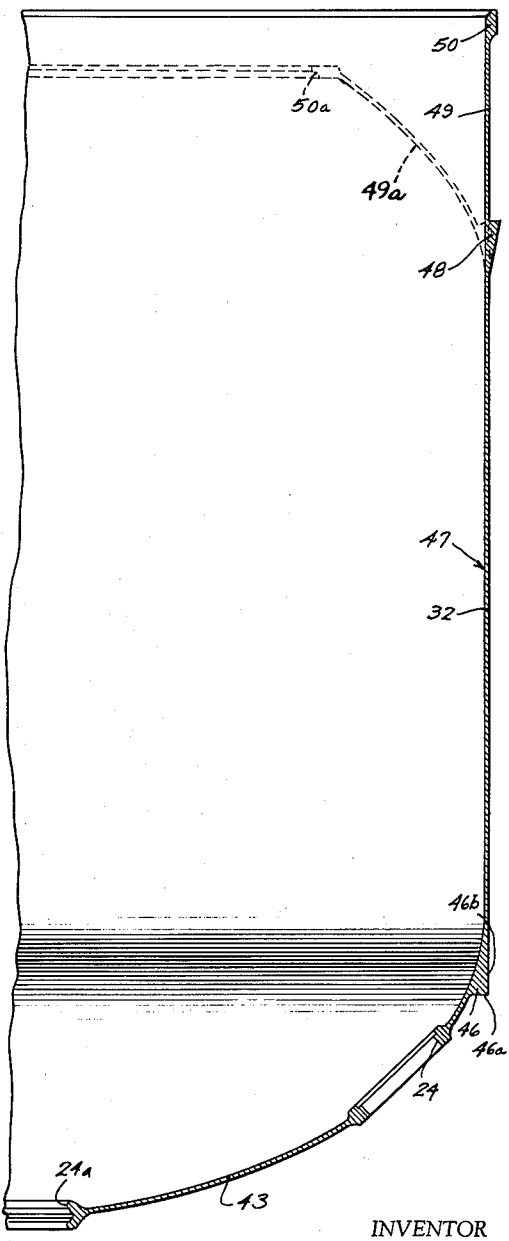
INVENTOR
Wayne A. Martin
BY
ATTORNEYS

INVENTOR
Wayne A. Martin

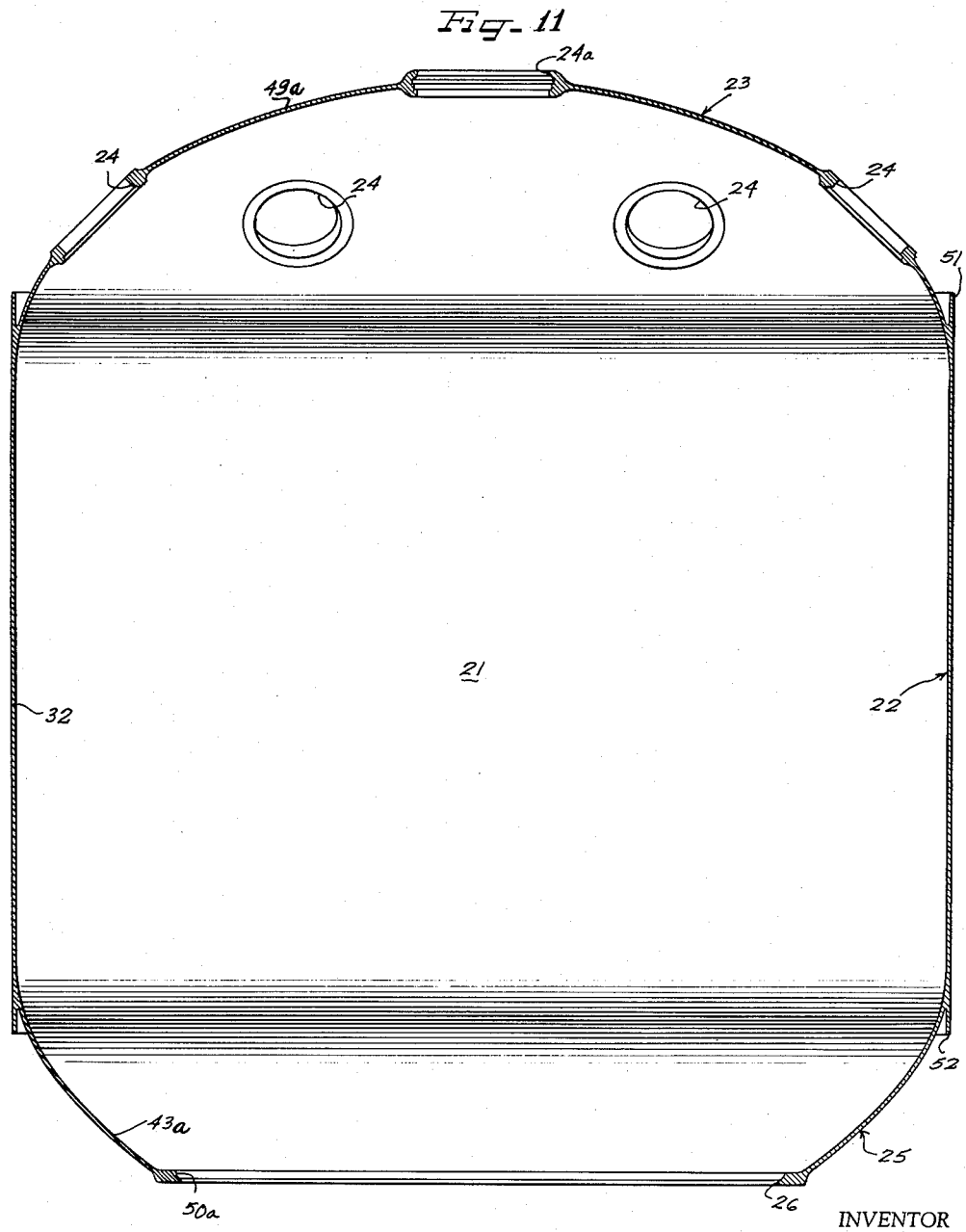

United States Patent Office 3,137,057
Patented June 16, 1964

3,137,057
MANUFACTURE OF MISSILE CASINGS
Wayne A. Martin, Berkley, Mich., assignor to Lyon Incorporated, Detroit, Mich., a corporation of Delaware
Filed Nov. 13, 1959, Ser. No. 852,755
12 Claims. (Cl. 29—1.21)

The present invention relates broadly to the manufacture of missile and related casings, and is more particularly concerned with a novel process of forming weapon component housings having among its features minimum utilization of machining and the production of a one-piece body without resort to welding techniques.

Rocket engine chambers and related missile casings necessarily must have a high strength to weight ratio and customarily are relatively thin wall structures formed of a relatively expensive high alloy steel. It is the current practice in the art to flow-turn at least the chamber center section, machine the end sections, and weld said sections one to the other. Not only is this method costly from a time and material standpoint, but the resulting structure falls far short of the desired strength properties.

As is further known, each motor chamber is provided with a plurality of thrust ports which function to reduce the missile speed at a predetermined point during flight. One technique employed is to weld the thrust port collar to the supporting chamber structure, and here again, much time is required and a weakening of the chamber walls can well result.

It is accordingly an important aim of the present invention to provide a forming method for missile and relating casings which avoids each of the named objections to and disadvantages of the prior art methods.

Another object of the invention lies in the provision of a method of producing an open-ended housing structure wherein a solid blank is successively formed to produce a drawn shape having thickened portions adjacent opposite ends thereof from which integral skirt portions are formed to provide attaching means for shroud structure connecting with adjacent housings to improve the aerodynamic characteristics of the resulting shape.

A further object of the instant invention is to provide a method of forming a hollow chamber with integral skirt portions thereon, which comprises drawing a cup-shape provided with a circumferential bead thereon to elongate said shape while producing second portions adjacent opposite ends thereof, shaping said second portions to provide axially extending skirt portions radially spaced from the walls of the elongated shape, and forming the open end of said shape to produce a hollow chamber of generally spherical configuration.

Other objects and advantages of the invention will become more apparent during the course of the following description, particularly when taken in connection with the accompanying drawings.

In the drawings, wherein like numerals are employed to designate like parts throughout the same;

FIGURE 1 is a side elevational view showing in full line a motor chamber as produced by the method of this invention, and showing in phantom lines an illustrative missile shape and thrust structure for the motor chamber;

FIGURE 2 is a plan view of a preferred form of blank used in the forming method of this invention;

FIGURE 3 is a vertical sectional view taken substantially along the line III—III of FIGURE 2;

FIGURE 3A is a vertical sectional view through another form of blank which may be employed;

FIGURE 4 is a fragmentary sectional view of a cup-shape formed from the blank of FIGURE 3;

FIGURE 5 is a sectional view through a portion of an elongated shape produced by a series of partial draws upon the shape of FIGURE 4;

FIGURE 10 is a fragmentary sectional view of the shape produced by the succeeding steps, and illustrating particularly the shaping of the thickened portions on the shape to ultimately produce the integral skirt portions; and FIGURE 11 is a sectional view through the shape as finally produced by the method steps of this invention.

Figure 6:
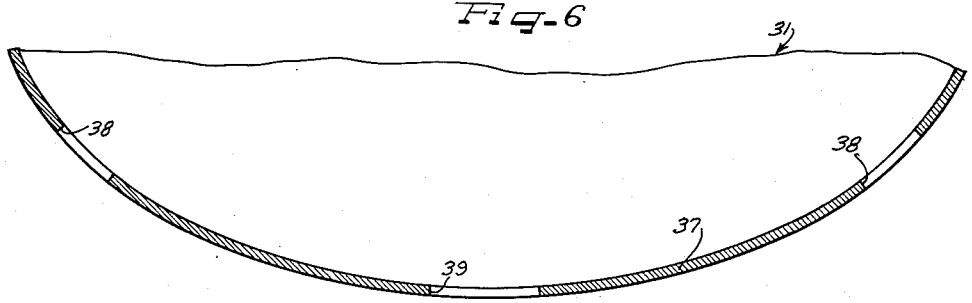
FIGURES 6 to 9 are fragmentary sectional views through end portions of the shape of FIGURE 5, to illustrate various punching, indenting and heading steps performed thereon.
Figure 7:
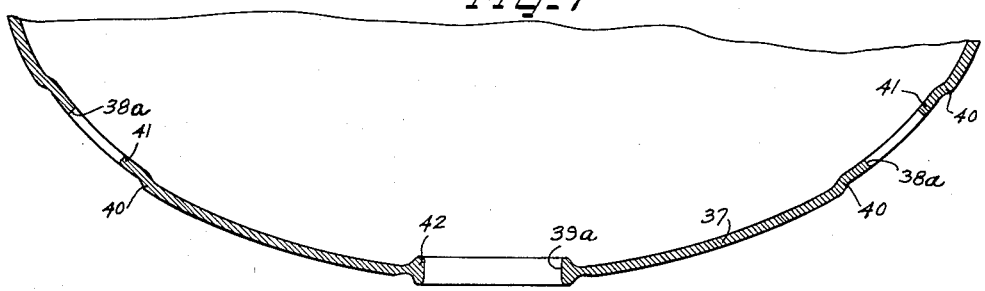

Referring now first to FIGURE 1 of the drawings, there is shown a missile or other space vehicle generally designated by the numeral 20, the propulsive force of which is provided by a plurality of power plants (not shown) housed in a plurality of motor chambers 21, only one of which is shown. As is known, thrust for a vehicle 20 is provided by sequential or simultaneous ignition of the power plants, and for this purpose the motor chambers are attached in a series one to the other. However, for the reasons earlier noted, the conventional motor chambers are far from satisfactory from the standpoints of strength properties and fabrication costs.

A motor chamber 21 as produced in accordance with the method steps of this invention is provided with a generally cylindrical body portion 22 integral at one end with a dome portion 23 apertured at a plurality of locations 24 which provide speed control devices communicating with the missile exterior, and through which exhaust gases are ported under action of timing devices to reduce the missile speed at a predetermined time. At the opposite end of the motor chamber body portion 22 there is provided a curved aft or tail portion 25 apertured centrally at 26 to receive a thrust assembly 27. It may now be seen that, generally speaking, the motor chamber 21 is an essentially spheroidal-ended cylinder, although it is of course appreciated that by pursuring the method steps of this invention other shapes may be produced. In addition, structures other than motor chambers can be provided by the forming steps herein disclosed, and while the forming process of this invention is of proven utility with high alloy steels, other metals may be similarly processed and good results obtained from the method to be now disclosed in detail.

The metal blank from which the motor chamber 21 is preferably produced is identified in FIGURES 2 and 3 by the numeral 28, and the blank 28 may be seen to be essentially circular in plane and provided by coining or other techniques with a circumferential bead or rounded protuberance 29 extending from one surface and spaced radially inwardly from the periphery or circumference thereof. The diameter of the blank 28 is of course calculated to provide sufficient metal for the motor chamber 21, and the thickness of the main portion of the blank as well as the thickness of the protuberance 29 are predetermined to provide sufficient metal mass from which the integral skirt portions may be formed.

The metal blank 28 is first subjected to a cupping operation, and as a result thereof the blank 28 is formed into a cup-shape 30 essentially of the configuration illustrated in FIGURE 4. The cup-shape 30 may be noted to be relatively shallow, and further, it will be seen that there is substantially no wall thickness reduction as a result of the cupping and that the wall thickness of the cup-shape 30 is uniform throughout, with the exception of the bead or bulge 29a extending outwardly along the outer diameter and circumferentially thereabout.

The cup-shape 30 is then preferably processed through a series of partial draw steps of the customary type, and resulting therefrom is an elongated shape 31 as illustrated in FIGURE 5. The elongated shape 31 as produced by the drawing operation has a central body portion 32 of substantially reduced wall thickness, and outwardly therefrom in one direction is a relatively thicker mouth portion 33 having a wall thickness not substantially reduced from the wall thickness of the elongated shape 30. In other words, during the drawing operation the metal mass in the elongated shape 30 and which lies upwardly of the rounded bead 29a is restrained against drawing forces, and the metal mass downwardly of the bead 29a is drawn to reduce the wall thickness and to provide the required amount of metal to form a second thickened portion 34 downstream of and integral with the body portion 32. It is of course now apparent that the wall thickness of the elongated shape 30 upwardly of the bead 29a, and identified in FIGURE 4 by the numeral 35, remains generally constant through the partial draw steps, so that the upper mouth portion 33 in FIGURE 5 and the portion 35 in FIGURE 4 may be considered to have generally the same wall thicknesses. In addition, as described, the metal mass in the cup-shape 30 downstream of the bead 29a, and identified in FIGURE 4 by the numeral 36, is flowed with the metal mass in said bead 29a to provide the central body portion 32 of the elongated shape 31, as well as to provide the thickened portion 34 thereon. During the partial draw step, there results in the elongated shape 31 a base portion 37 having a wall thickness somewhat less than the original wall thickness of the cup-shape 30. Accordingly, the elongated shape 31 retains the original wall thickness of the cup-shape 30 in only the thickened mouth portion 33 and thickened portion 34 connecting the central body portion 32 and the base portion 37.

The next sequence of steps performed upon the elongated shape 31 are directed at the base portion 37 thereof to ultimately provide the openings 24 in the motor chamber 21 of FIGURE 1. These steps are illustrated in FIGURES 6 to 9, and it will be noted therefrom that certain of the apertures ultimately providing the openings 24 are omitted from FIGURES 6 to 9 in the interest of greater clarity.

Base portion 37 of the elongated shape 31 is apertured by suitable punching or related techniques to form therein a plurality of spaced openings 38 and 39, the latter numeral designating a central hole or aperture of relatively greater diameter than the openings 38. In the form of motor chamber 21 illustrated in FIGURE 1, the openings 38 are six in number, although of course this is illustrative only.

The openings 38 and 39 may be seen to have been punched so that the surrounding wall surfaces are essentially straight-walled. Thereafter, the next step to be preferably performed is to indent the base portion 37 of the shape 31 radially outwardly of the center of each opening 38a, so that at these locations the base portion 37 has a pair of radially inclined portions 40 connecting with generally flat wall portions 41 surrounding each opening 38a.

Figure 8:
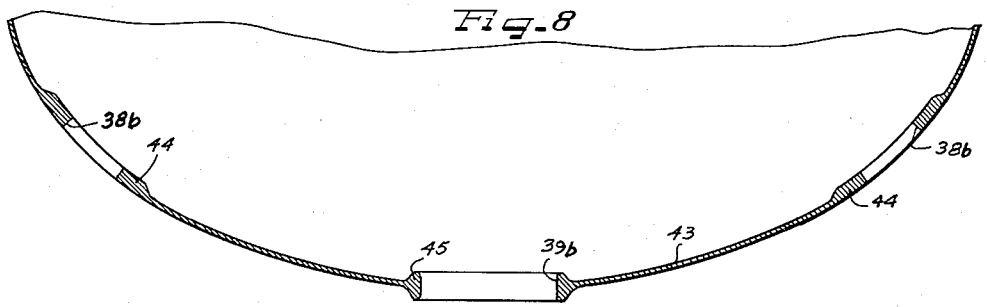

A further operation then preferably performed on the base portion 37 is to head said portion adjacent the central opening 39a to form thereabout a thickened annular portion 42. The entire base portion 37 is then machined along the outer diameter thereof to produce essentially the configuration shown in FIGURE 8. It may thus be seen that the base portion between the openings 38b and 39b is of substantially reduced wall thickness, and may have a wall thickness generally corresponding to that of the central body portion 32 of the elongated shape 31 of FIGURE 5. The machined base portion 37 of FIGURE 8 is identified therein by the numeral 43, and said base portion is characterised by relatively thicker inwardly sloping annular portions 44 surrounding each opening 38b, and a thickened annular portion 45 surrounding the opening 39b.

Figure 9:
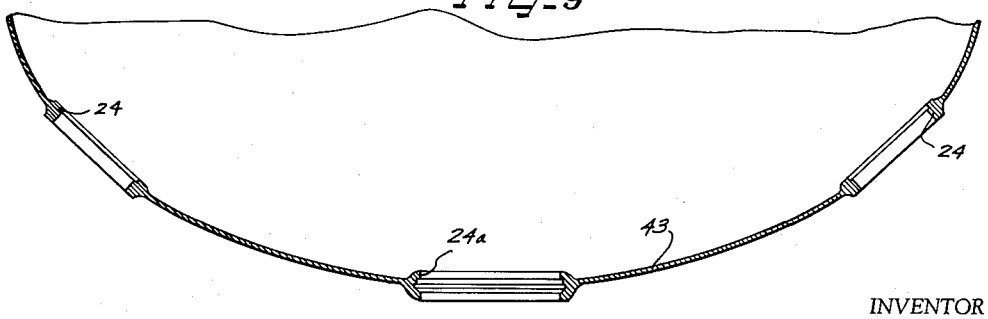

A final machining step is then performed upon the reduced thickness base portion 43, and particularly upon the relatively thicker annular portions 44 and 45 surrounding the openings 38b and 39b, respectively. This is illustrated in FIGURE 9, and the openings 38b as thus produced are identified therein by the numeral 24 and the machined opening 39b as 24a, to correspond with like numerals in FIGURE 1.

As a part of the machining steps described in connection with FIGURES 8 and 9, the thickened portion 34 on the elongated shape 31 is contoured to generally the configuration shown in FIGURE 10. It may be noted that there results a thickened portion 46 having a generally straight bottom wall 46a and a generally straight side wall 46b extending circumferentially about the machined elongated shape, identified in FIGURE 10 generally by the numeral 47.

A machining operation is also performed upon the thickened mouth portion 33 of the elongated shape 31, and provided by said machining is a thickened step portion 48 corresponding generally to the cross-sectional configuration of the thickened portion 46, and connecting with said thickened portion 48 is a reduced thickness wall portion 49 and an increased thickness marginal end portion 50. Generally speaking, the thicknesses of the wall portions 32 and 49 will be more or less the same.

To provide the convergent end portion 25 of the motor chamber 21 as shown in FIGURE 1, the thickened step portion 48, the wall portion 49 connecting therewith and the marginal end portion 50 are turned radially inwardly by suitable nosing techniques in the manner indicated in FIGURE 10 by phantom lines therein. To receive the thrust nozzle assembly 27 of FIGURE 1, the marginal end portion 50 of the elongated and machined shape 47 may have a stepped inner diameter, as indicated in FIGURE 10 by the numeral 50a.

Prior to or after the nosing step described, a further machining step may be performed and this is directed at the thickened step portions 46 and 48 at opposite ends of the central body portion 32 of the elongated shape 47. The machining action which is performed may be noted upon comparison of FIGURES 10 and 11, and it will be seen that the thickened portions 46 and 48 are cut axially in opposite directions to provide axially spaced and circumferentially extending skirt portions 51 and 52. Each skirt portion 51 and 52 may be seen to extend in generally a straight line parallel to the central longitudinal axis of the motor chamber body portion 22, and to be spaced sufficiently from the wall portions 43a and 49a to permit attachment of tubular shields or shrouds to other motor chambers of generally corresponding shape. In this manner the aerodynamic smoothness of the missile is improved, but more importantly, there are no welds made directly to the walls of the pressure vessel.

If desired, the generally flat blank from which the motor chamber 21 is formed may be initially provided with an opening to form the thrust port 24a. This is shown in FIGURE 3A, wherein the blank is identified by the numeral 28a and is provided with a central opening 28b surrounded by a relatively thicker annular portion 28c. In this manner the amount of punching is reduced, and the thicker portion 28c and adjacent wall structure is of course ultimately machined in the manner described in connection with FIGURES 6 to 9.

It is important to now note that by initially punching the openings 38 and 39, which later form the thrust ports 24 and 24a, there is provided a convenient means to attach the shape to a suitable fixture during machining and other forming steps. The hold-down of the shape is thereby facilitated, and greater accuracy in the forming steps obtained.

It is further to be appreciated that certain of the described machining steps may be supplanted by other forming techniques.

It is now apparent that by the method of this invention the high rate of rejects encountered in earlier processes has been eliminated. Further, the investment in the missile or other airborne vehicle is also substantial, and weaknesses in the motor chambers resulting in misfirings represent substantial losses in labor and materials. In fact, a failure of the motor chamber can produce a loss of the entire missile, which is often represented by an investment of millions of dollars. Additionally, it may be noted that the motor chamber 21 as herein produced is an integral one-piece construction, and is thereby characterized by its ability to withstand higher thrust loads, which in turn permit increased missile speed and range. As produced herein of high alloy steels, the motor chamber 21 is capable of withstanding pressures of the order of 275,000 p.s.i. yield and 330,000 p.s.i. tensile. Further, it will also be observed that by the forming techniques herein employed essentially the final shape is produced and extensive machining is not required. Labor and material savings again result, and since the shroud weld attachments are made at locations spaced from the motor chamber walls, inspection techniques are greatly facilitated, and as compared with motor chambers welded of several sections, the number of inspection procedures required are greatly reduced.

While a preferred sequence of steps has been described herein, it is of course apparent that many variations therefrom are possible without departing from the novel concepts of the present invention.

I claim as my invention:

1. A method of forming a hollow chamber with integral skirt portions thereon, which comprises drawing a cup-shape provided with a circumferential bead thereon to elongate said shape while producing thickened portions adjacent opposite ends thereof, shaping said thickened portions to provide axially extending skirt portions radially spaced from the walls of the elongated shape, and forming the open end of said shape to produce a spheroidal-ended cylinder.

2. A method of forming a hollow chamber with integral skirt portions thereon, which comprises shaping a metal blank into a relatively shallow cup configuration, elongating said cup to produce a shape having thickened portions at the mouth and also axially inwardly of the base thereof, shaping said thickened portions to provide axially extending skirt portions radially spaced from the walls of the elongated shape, and forming the open end of said shape to produce a spheroidal-ended cylinder.

3. A method of forming a hollow chamber with integral skirt portions thereon, which comprises shaping a metal disc having an annular bead on one surface thereof into a cup-shape with said bead on the outer diameter, drawing said cup-shape to form said bead into a thickened portion on the elongated shape providing another thickened portion axially spaced from the first thickened portion, shaping said thickened portions to provide axially extending skirt portions radially spaced from the walls of the elongated shape, and forming the open end of said shape to produce a spheroidal-ended cylinder.

4. A method of forming a hollow chamber with integral skirt portions thereon, which comprises cupping a metal blank provided with an annular protuberance on one surface thereof radially inwardly spaced from the periphery of said blank to form a cup-shape, drawing said cup-shape to move the metal from said protuberance to form an elongated shape having a thickened mouth portion while providing a thickened portion axially inwardly of the base of said elongated shape, shaping said thickened portions to provide axially extending skirt portions radially spaced from the walls of the elongated shape, and forming the open end of said shape to produce a spheroidal-ended cylinder.

5. A method of forming a hollow chamber with integral skirt portions thereon, which comprises drawing a cup-shape provided with a circumferential bead on the outer diameter spaced axially inwardly of the open end thereof to elongate said shape while producing thickened portions at the open end of said elongated shape and radially outwardly from the closed end thereof, machining said thickened portion to provide axially extending skirt portions radially spaced from the walls of the elongated shape, and turning the open end of the machined elongated shape radially inwardly to produce a spheroidal-ended cylinder.

6. A method of forming a hollow chamber with integral skirt portions thereon, which comprises drawing a cup-shape provided with a circumferential bead on the outer diameter spaced axially inwardly of the open end thereof to elongate said shape while producing thickened portions at the open end of said elongated shape and radially outwardly from the closed end thereof, reducing the wall thickness of the closed end of the elongated shape, shaping the thickened portion adjacent the closed end of the elongated shape to provide an axially extending skirt portion radially spaced from the walls thereof, shaping the thickened portion at the open end of the elongated shape to first provide another axially extending skirt portion and to then provide a thickened collar portion axially outwardly of said skirt portion, and turning said collar portion radially inwardly to produce a spheroidal-ended cylinder.

7. A method of forming a hollow chamber with integral skirt portions thereon, which comprises drawing a cup-shape provided with a circumferential bead on the outer diameter spaced axially inwardly of the open end thereof to elongate said shape to provide a reduced thickness central body portion and annular thickened portions at opposite ends of said body portion, one of said thickened portions being at the open end of the shape and another along the closed end thereof, reducing the wall thickness of the closed end of the elongated shape to generally the wall thickness of the central body portion thereof, shaping the thickened portion adjacent the closed end of the elongated shape to provide an axially extending skirt portion radially spaced from the walls thereof, shaping the thickened portion at the open end of the elongated shape to first provide another axially extending skirt portion and to then provide a thickened collar portion axially outwardly of said skirt portion, and turning said collar portion radially inwardly to produce a spheroidal-ended cylinder.

8. A method of forming a hollow chamber having an integral generally dome-shaped end portion with a plurality of openings therein, which comprises aperturing the end portion of an elongated shape open at its opposite end, indenting said end portion outwardly of the apertures therein to produce indented wall portions surrounding said apertures, and heading said indented wall portions to provide relatively thicker annular wall portions surrounding said apertures, and machining the end portion along the outer diameter thereof and between the indented wall portions, said relatively thicker annular wall portions sufficiently rigidifying the end portion outwardly of the apertures to render unnecessary welding or otherwise attaching supporting rings to said end portion outwardly of the apertures.

9. A method of forming thrust ports in the end portion of a hollow chamber, which comprises successively punching said end portion to provide a plurality of openings therethrough, indenting said end portion outwardly of said openings to provide annular indented end portion segments, and heading said end portion and the indented segments to provide annular thickened collar portions surrounding said openings, thereby producing thrust ports of sufficient strength as to render unnecessary welding or otherwise attaching collar means.

10. A method of forming a hollow chamber with an integral skirt portion thereon, which comprises drawing a cup-shape to produce an elongated shape having a reduced thickness body portion and an integral annular thickened portion, shaping said thickened portion to provide an axially extending skirt portion radially spaced from said reduced thickness body portion, and shaping said body portion to provide a spheroidal-ended cylinder.

11. A method of forming a hollow chamber with an integral skirt thereon, which comprises forming a flat blank having an annular bead thereon, drawing the blank to form a cup-shape having a rounded bottom and disposing the bead externally of the cup-shape adjacent the bottom, shaping the bead to provide an axially extending skirt radially spaced about the bottom, and forming an open end of the cup-shape to produce a spheroidal-ended cylinder.

12. A method of forming a hollow chamber with integral skirt portions thereon, which comprises forming a metal blank with an annular protuberance on one surface thereof radially inwardly spaced from the periphery of said blank, cupping the blank to form a cup-shape with the protuberance on an exterior surface adjacent the bottom, drawing said cup-shape to move the metal from said protuberance to form an elongated shape having a thickened mouth portion while providing a thickened portion radially outwardly from the base of said elongated shape, shaping said thickened portions to provide axially extending skirt portions radially spaced from the walls of the elongated shape, and forming the open end of said shape to produce a spheroidal-ended cylinder.

References Cited in the file of this patent

UNITED STATES PATENTS

| | | |
|---|---|---|
| 490,773 | Osborne | Jan. 31, 1893 |
| 922,585 | Hooker | May 25, 1909 |
| 926,875 | Jones | July 6, 1909 |
| 2,030,818 | Harter | Feb. 11, 1936 |
| 2,168,406 | Harris | Aug. 8, 1939 |
| 2,182,067 | Bruckner | Dec. 5, 1939 |
| 2,212,383 | Yeomans | Aug. 20, 1940 |
| 2,237,993 | Korbuly | Apr. 8, 1941 |
| 2,241,478 | Remington | May 13, 1941 |
| 2,301,565 | Moore | Nov. 10, 1942 |
| 2,357,110 | Heineman | Aug. 29, 1944 |
| 2,404,304 | Layton | July 16, 1946 |
| 2,627,231 | Kraemer | Feb. 3, 1953 |
| 2,862,447 | Lyon | Dec. 2, 1958 |
| 2,891,298 | Kaul | June 23, 1959 |
| 2,898,788 | Baxa | Aug. 11, 1959 |
| 2,920,374 | Lyon | Jan. 12, 1960 |
| 3,032,858 | Martin | May 8, 1962 |

FOREIGN PATENTS

| | | |
|---|---|---|
| 1,245,911 | France | Oct. 3, 1960 |